(12) United States Patent
Weber

(10) Patent No.: US 7,095,630 B2
(45) Date of Patent: Aug. 22, 2006

(54) CAPACITIVELY COUPLED POWER SUPPLY

(75) Inventor: Rudolf Weber, Meilen (CH)

(73) Assignee: Thomson Licensing, Boulogne-Billancourt (FR)

( * ) Notice: Subject to any disclaimer, the term of this patent is extended or adjusted under 35 U.S.C. 154(b) by 60 days.

(21) Appl. No.: 10/531,121

(22) PCT Filed: Oct. 16, 2003

(86) PCT No.: PCT/IB03/05523

§ 371 (c)(1),
(2), (4) Date: Apr. 11, 2005

(87) PCT Pub. No.: WO2004/038920

PCT Pub. Date: May 6, 2004

(65) Prior Publication Data

US 2006/0164868 A1    Jul. 27, 2006

Related U.S. Application Data

(60) Provisional application No. 60/418,823, filed on Oct. 16, 2002.

(51) Int. Cl.
*H02M 3/335* (2006.01)
*G05F 1/656* (2006.01)
(52) U.S. Cl. .............................. 363/16; 323/222
(58) Field of Classification Search .............. 363/16, 363/39, 40, 44, 95, 97; 323/222
See application file for complete search history.

(56) References Cited

U.S. PATENT DOCUMENTS 4,897,775 A * 1/1990 Klaassens .................. 363/96

6,144,565 A  11/2000 Lethellier

FOREIGN PATENT DOCUMENTS

EP    0696841    2/1996

OTHER PUBLICATIONS

Lloyd Dixon: "High Power Factor Preregulator Using The Sepic Converter", Unitrode Power Supply Design Seminar Topics, 'Online' 1993, XP002277199.

* cited by examiner

*Primary Examiner*—Adolf Berhane
(74) *Attorney, Agent, or Firm*—Joseph S. Tripoli; Harvey D. Fried; Christine Johnson

(57) ABSTRACT

A power supply includes a supply inductor and a first capacitor coupled to form a resonant circuit to generate a resonant waveform in a resonant operation, during a first portion of an operation cycle of the power supply. A charge storage element develops an output voltage to energize a load. A rectifier is coupled to the charge storage element and to the resonant circuit and is responsive to the resonant waveform for applying the output voltage back to the resonant circuit to interrupt the resonant operation, at an end time of the operation cycle first portion, when the resonant waveform produces a first change of state in the rectifier. A first sensor senses when the first change of state in the rectifier occurs. A source of a supply current is coupled to the rectifier and rectified in the rectifier to produce a rectified current that is coupled to the charge storage element to replenish a charge therein, during a second portion of the operation cycle. A switching transistor is responsive to an output signal of the first sensor for enabling the supply current to be coupled to the rectifier, during the operation cycle second portion, and for disabling the supply current from being coupled to the rectifier, during the operation cycle first portion.

11 Claims, 6 Drawing Sheets

RL=7.5 Ohm (15V@2A)

Vg S1 (10V/div)
I2 (0.5A/div)
V1 (100V/div)
1 µS/div

RL=10 Ohm (2V, 2.1A)

CAPACITIVELY COUPLED POWER SUPPLY

RELATED APPLICATIONS

This application claims the benefit, under 35 U.S.C. § 365 of International Application PCT/IB03/05523, filed Oct. 16, 2003, which was published in accordance with PCT Article 21(2) on May 6, 2004 in English and which claims the benefit of U.S. provisional patent application No. 60/418,823, filed Oct. 16, 2002.

FIELD OF THE INVENTION

The present invention relates to power supplies in general, and more particularly, to generating a supply voltage using capacitive coupling in a main current path.

BACKGROUND OF THE INVENTION

Power supplies serve the purpose of converting an input voltage into one or several output voltages. An AC power source may be used to provide an AC power line input, which gets converted to a DC regulated output voltage. Transformers are typically used to provide isolation between a "hot" ground and a "cold" ground for a power supply or a converter. A primary winding of a transformer typically conducts a non-isolated direct current (DC). In the event of a overloading, the current in the primary winding might be, disadvantageously, excessive and may damage, for example, a power transistor that drives the transformer. Additionally, transformers are typically large in size (due to the size of the magnetic elements within them), bulky and expensive devices. It may be desirable to have a power supply that is inherently short circuit protected in a manner that avoids using dedicated circuit components.

In carrying out an inventive feature, a regulated power supply utilizes capacitive elements to transform an input voltage from, for example, a DC power source to a specified output voltage level across a load. The capacitive element, advantageously, could provide capacitive isolation between a "hot" ground and a "cold" ground.

SUMMARY OF THE INVENTION

A power supply, embodying an inventive feature, includes a supply inductor and a first capacitor coupled to form a resonant circuit to generate a resonant waveform in a resonant operation, during a first portion of an operation cycle of the power supply. A charge storage element develops an output voltage to energize a load. A rectifier is coupled to the charge storage element and to the resonant circuit and is responsive to the resonant waveform for applying the output voltage back to the resonant circuit to interrupt the resonant operation, at an end time of the operation cycle first portion, when the resonant waveform produces a first change of state in the rectifier. A first sensor senses when the first change of state in the rectifier occurs. A source of a supply current is coupled to the rectifier and rectified in the rectifier to produce a rectified current that is coupled to the charge storage element to replenish a charge therein, during a second portion of the operation cycle. A switching transistor is responsive to an output signal of the first sensor for enabling the supply current to be coupled to the rectifier, during the operation cycle second portion, and for disabling the supply current from being coupled to the rectifier, during the operation cycle first portion.

DETAILED DESCRIPTION

Figure 1:
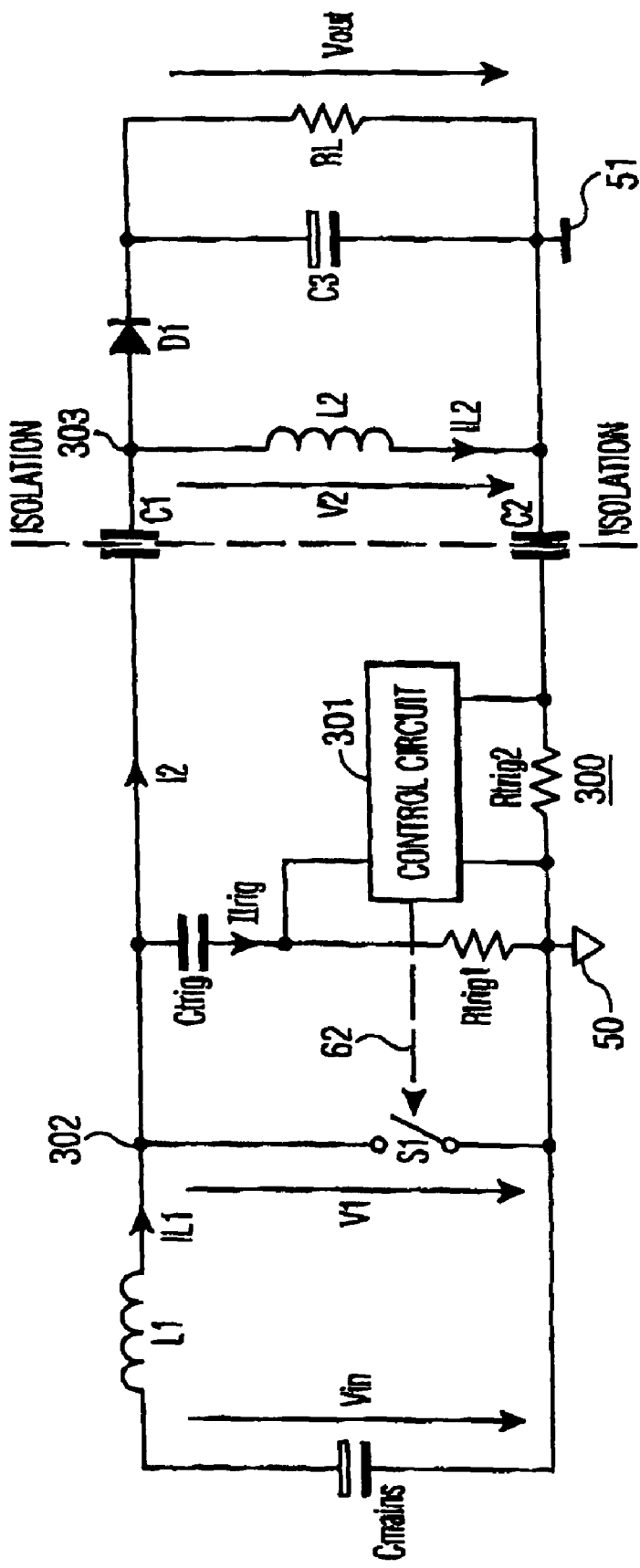
FIG. 1 shows a power supply with capacitive mains isolation in accordance with an embodiment of the present invention.

FIG. 1 illustrates a power supply 300, partially in a schematic form, with capacitive mains isolation, embodying an inventive feature. An input supply voltage Vin referenced to a "hot" ground conductor 50 is produced in, for example, a conventional bridge rectifier, not shown, and is non-isolated from "hot" ground conductor 50. Voltage Vin is coupled via a supply inductor L1 to a terminal 302 of a switch S1 formed by a switching power transistor, not shown, that is controlled by a control circuit 301 to switch a high frequency. Terminal 302 is coupled to ground conductor 50 when switch S1 is conductive.

When switch S1 is non-conductive, terminal 302 is coupled to ground conductor 50 via a series arrangement of a first isolation capacitor C1, a second isolation capacitor C2, a second supply inductor L2 that is coupled between capacitors C1 and C2 and a current sampling resistor Rtrig2. Current sampling resistor Rtrig2 is coupled between capacitor C2 and ground conductor 50. When switch S1 is non-conductive, terminal 302 is also coupled to ground conductor 50 via a series arrangement of a capacitor Ctrig and a current sampling resistor Rtrig1. Current sampling resistor Rtrig1 is coupled between capacitor Ctrig and ground conductor 50. A rectifier diode D1 and a filter capacitor C3 form a series arrangement that is coupled across inductor L2 for developing a rectified output supply voltage Vout in capacitor C3 forming a charge storage element. A load resistor RL is coupled in parallel with capacitor C3 and energized by voltage Vout. Voltage Vout is isolated with respect to electrical shock hazard from ground conductor 50 by the high impedance at low frequencies of capacitors C1 and C2.

An anode of diode D1 is coupled to a junction terminal 303 between capacitor C1 and inductor L1. A terminal of capacitor C3 that is remote from a cathode of diode D1 forms a "cold" ground conductor 51. Voltage Vout that is referenced to "cold" ground conductor 51 is isolated with respect to electrical shock hazard from ground conductor 50. A terminal of inductor L2 that is remote from diode D1 and a terminal of capacitor C2 that is remote from resistor Rtrig2 also are at the reference potential of "cold" ground conductor 51.

Capacitors C1 and C2 provide ground isolation due to the fact that the capacitors have a high impedance at the relatively low frequency of Vin. However, the capacitors represent a low impedance at the relatively high frequency of operation of switch S1, which is at a higher frequency than that of voltage Vin. Switch S1 is responsive to a control signal 62 from control circuit 3 for selectively opening/closing the connection between terminals 302 and 50 to disable/enable application of the input supply voltage Vin to inductor L1. In this manner the switch is operated cyclically at a given frequency f in accordance with the control signal. Capacitors C1 and C2 have low impedance with respect to this frequency. For example, capacitors C1 and C2 may have a low impedance in relation to operation of switch S1 at 50 KHz, while providing a high impedance and isolation at an input voltage Vin of, for example, 50 Hz or 60 Hz. Power supply 300 is a self-oscillating power converter, which is optimized for maximum energy transfer at minimum switching loss.

An operating cycle or a period T of power supply 300 can be divided in three time intervals T1, T2 and T3, shown in FIGS. 2a–2f, for a value of inductor L1 of FIG. 1 equal to twice that of inductor L2. Similar symbols and numerals in FIGS. 1 and 2a–2f indicate similar functions or items. FIG. 3a represents the equivalent circuit to the circuit of FIG. 1 during interval T1 of FIGS. 2a–2f. Similar symbols and numerals in FIGS. 1, 2a–2f and 3a indicate similar functions or items.

During interval T1 of FIGS. 2a–2f, switch S1 of FIG. 1 is conductive. Capacitors C1 and C2 are charged during interval T2 of FIGS. 2a–2f, as described later on. After closing switch S1 of FIG. 1, during interval T1 of FIGS. 2a–2f, a current IL1 of FIG. 2b rises linearly and energy is stored in inductor L1 of FIG. 1. At the same time, a current IL2 of FIG. 2d in inductor L2 of FIG. 1, forming a resonant circuit 305 of FIG. 3a with capacitors C1 and C2 of FIG. 1, goes negative sinusoidally in a resonant manner and the energy previously stored in capacitors C1 and C2 is transferred in a resonance manner to inductor L2 in the form of current I2.

Figure 2A:
FIGS. 2a, 2b, 2c, 2d, 2e and 2f show waveforms associated with the operation of the power supply shown in FIG. 1.
Figure 2B:
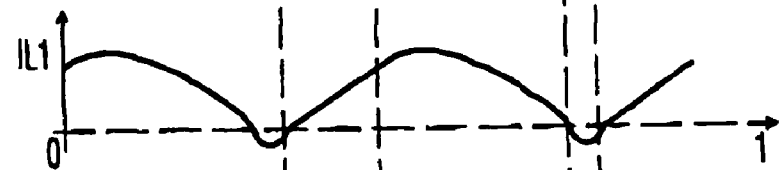
Figure 2C:
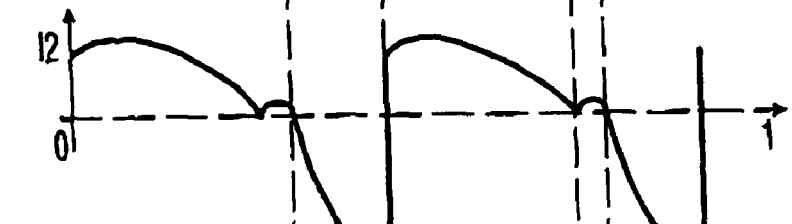
Figure 2D:
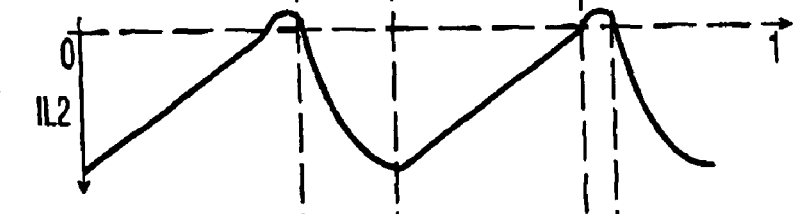
Figure 2E:
Figure 2F:
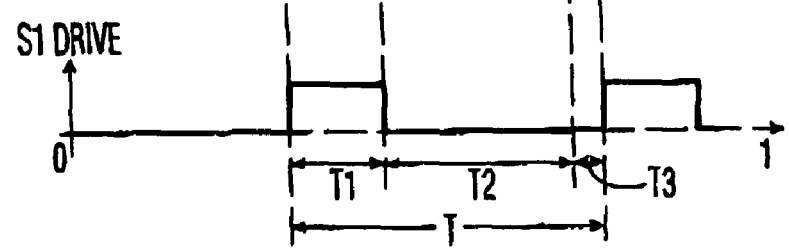
Figure 3A:
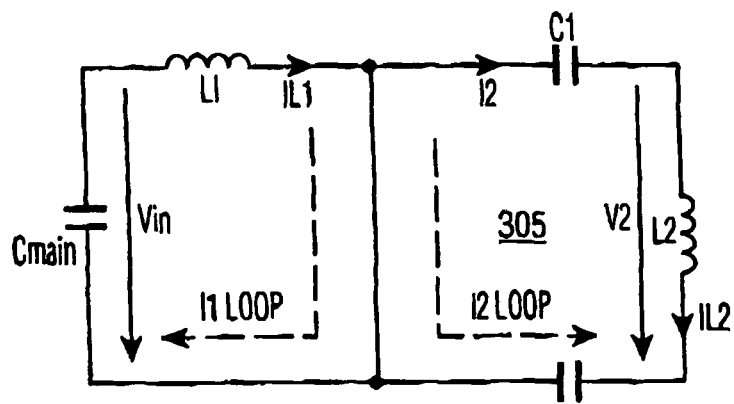
FIGS. 3a, 3b and 3c show three equivalent circuits of the power supply of FIG. 1 during three separate intervals, respectively, of a period of operation of FIGS. 2a–2f.

At the end of interval T1 of FIGS. 2a–2f, voltage V2 of FIG. 2e becomes equal to voltage Vout of FIG. 1 causing diode D1 to become conductive. Consequently, a sum of voltages in capacitors C1 and C2 is clamped to voltage Vout and current I2 changes abruptly to become zero. Thus, capacitors C1 and C2 are discharged to a maximum extent and a voltage V2 of FIG. 2e in inductor L2 of FIG. 1 becomes equal to voltage Vout. At the beginning of interval T2 of FIGS. 2a–2f, diode D1 of FIG. 1 is, consequently, conductive. Therefore, the voltage across sensor resistor Rtrig2 of FIG. 1 approaches zero volts. When the voltage across resistor Rtrig2 becomes zero, control circuit 301 turns off switch S1 via signal 62. Advantageously, by turning switch S1 on immediately after diode D1 becomes conductive, the possibility of a "dead time" in the period T of FIGS. 2a–2f, that does not contribute to the throughput via capacitors C1 and C2, is avoided.

Figure 3B:
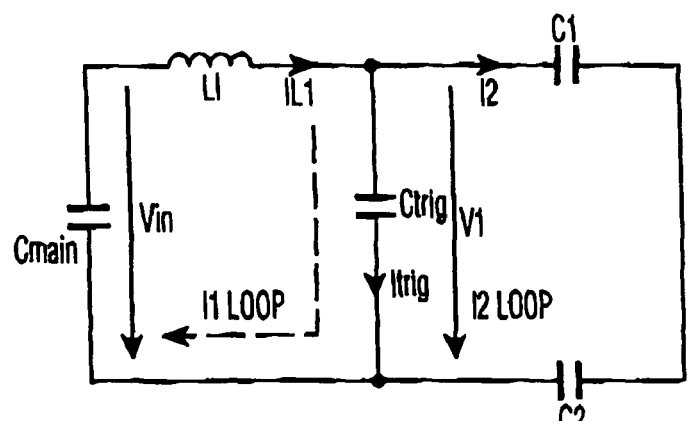

FIG. 3b represents the equivalent circuit to the circuit of FIG. 1, during interval T2 of FIGS. 2a–2f. Similar symbols and numerals in FIGS. 1, 2a–2f and 3b indicate similar functions or items. During interval T2 of FIGS. 2a–2f, switch S1 of FIG. 1 is turned off. Conductive diode D1 and capacitor C3 form effectively a negligible low impedance because capacitor C3 has a much larger value than the other capacitors. Capacitors C1 and C2 and Ctrig are charged via inductor L1 until, at the end of interval T2, voltage V1 of FIG. 2a reaches a maximum value and current I2 of FIG. 2c becomes zero. At this instant almost all energy present in the circuit is stored in capacitors C1 and C2.

Figure 3C:
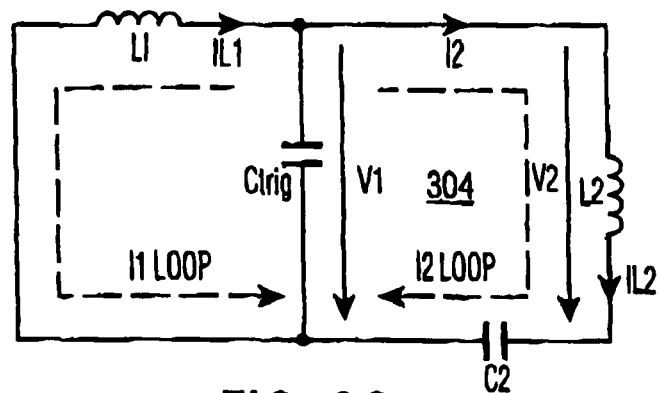

FIG. 3c represents the equivalent circuit to the circuit of FIG. 1, during a following interval T3 of FIGS. 2a–2f. Similar symbols and numerals in FIGS. 1, 2a–2f and 3c indicate similar functions or items. During interval T3 of FIGS. 2a–2f, a trigger signal 62 for turning on switch S1 of FIG. 1 is produced. During interval T3 of FIGS. 2a–2f, capacitors C1 and C2 of FIG. 1 can be neglected since their values are much larger than that of capacitor Ctrig. Capacitor Ctrig forms a parallel resonance circuit 304 of FIG. 3c with inductors L1 and L2, and a half cycle of oscillation occurs. Voltage V1 reaches its minimum at the end of interval T3 and current IL2 returns to zero. At the end of interval T3, a voltage developed across current sampling resistor Rtrig1 of FIG. 1 changes polarity from negative to positive. This zero crossing transition is sensed and causes control circuit 301 to turn on switch S1. Advantageously, the switching losses are negligible, because voltage V1 is at a minimum. All capacitors are part of a resonant network, which prevents the presence of high dv/dt's, thus ensuring a high efficiency.

Figure 4:
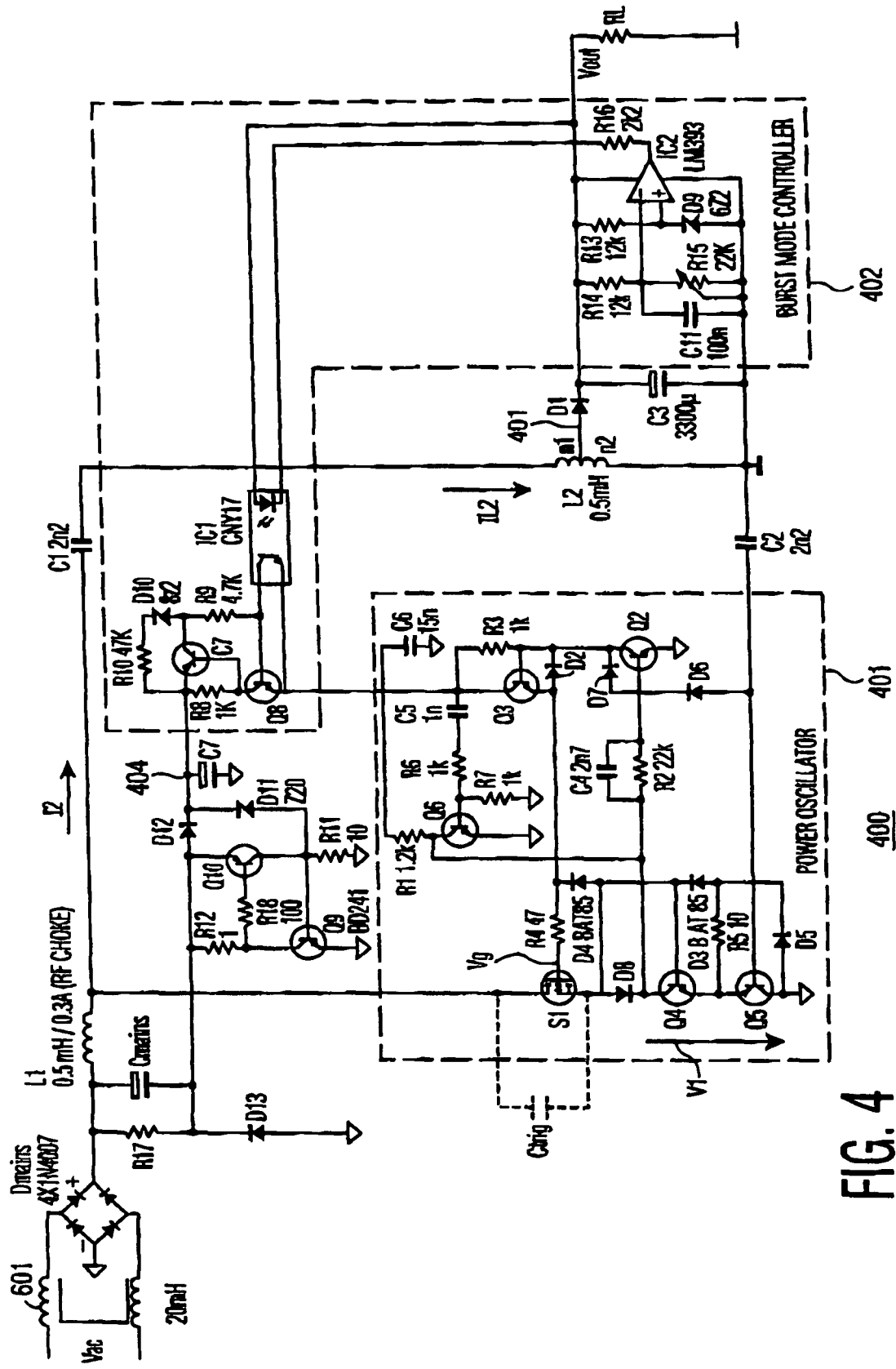
FIG. 4 shows a power supply operating using inventive features of the power supply of FIG. 1 and in more details.

FIG. 4 illustrates a power supply 400 in details that is similar to that of FIG. 1. Similar symbols and numerals in FIGS. 1, 2a–2f and 3a–3c and 4 indicate similar functions or items.

Components L1, L2, C1, C2, S1, D1 and C3 of FIG. 4 perform the same functions as in FIG. 1. Inductor L2 is tapped in order to transform voltage Vout to lower levels. At the mains connection side an additional line filter 601 is implemented to guaranty the required isolation between the primary and the secondary side. Therefore, the line filter inductor establishes a high asymmetrical attenuation at the operation frequency. The internal drain to source capacitance of transistor switch S1 is used to perform the function of capacitor Ctrig of FIG. 1.

In a first embodiment, power supply 400 of FIG. 4 generates an output power of 25 W with an input voltage of 115V AC. In a second embodiment, power supply 400 of FIG. 4 generates an output power of 100 W with an input voltage of 230V AC. Only switch S1 and the tap ratio of inductor L2 are different. The power transferred by power supply 400 is given by: P=VcI2*(the value of capacitor C1)*f if the value of capacitor C2 equal to that of capacitor C1, Vc1 is the voltage across C1 and "f" is the switching frequency.

Figure 7:
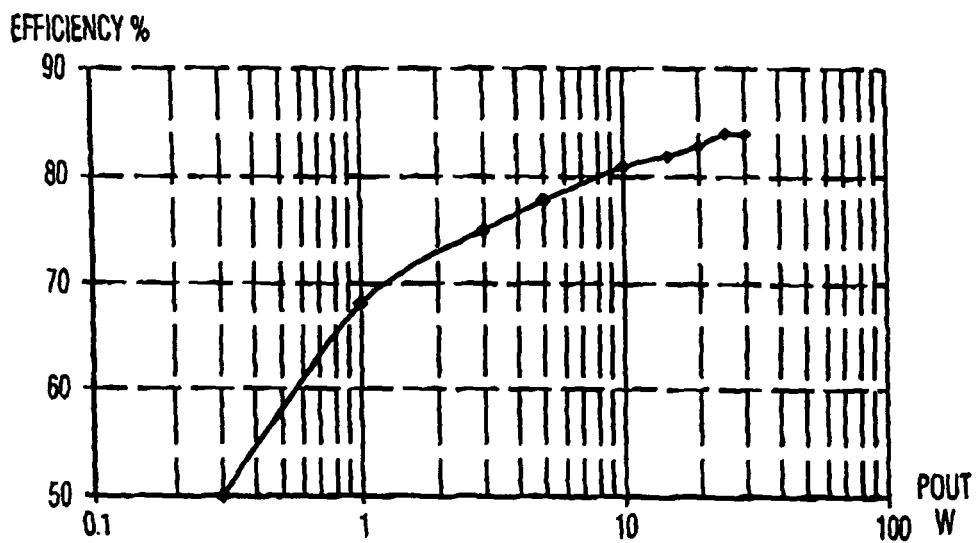
FIG. 7 illustrates a graph showing an example of the variation of the efficiency of the power supply of FIG. 4 as a function of the output power.

The transformation ratio depends on the ratio of the inductances of inductors L1 and L2 and the duration of interval T3. This ratio can be increased by providing inductor L2 with a tap 401. The converter consists of a power oscillator 401 and a burst mode controller 402. Oscillator 401 runs at about f=300 kHz. When a comparator IC2 of burst mode controller 402 senses nominal output voltage, oscillator 401 is turned off by interrupting the power to the oscillator via an opto-coupler IC1 and a transistor Q8. A lower voltage at the output turns it on again. Thus the power supply operates in burst mode. The interval between the bursts varies with input voltage and load. Maximum power output is obtained when the oscillator is continuously on. The relation between efficiency and output power is shown in FIG. 7.

A supply voltage 404 of the control circuit is generated by a charge current through a filter capacitor Cmains via a diode D12 and a capacitor C7 that forms a capacitive voltage divider with capacitor Cmains. The circuit includes a transistor Q9, a transistor Q10 and a reference voltage diode D11 that limit the voltage across capacitor C7 to 20V.

A transistor Q7, a transistor Q8, an opto-coupler IC1 and a comparator IC2 act as an on/off switch for the supply voltage of oscillator 401 to control the duration of a burst. A resistor RIO and a diode D10 enable initial start-up of power oscillator 401. Transistors Q7 and Q8 turn on with a fast rising edge causing switch S1 to turn on via transistor Q3. Transistor Q6 turns on at the same edge, but because of a time constant of a capacitor C5 and a resistor R6 it turns off a few microseconds later. This turns on transistor Q2 and switch transistor S1 is switched off. This arrangement is used to guarantee a proper start-up of the oscillator. As a result, interval T2 of FIGS. 2a–2f is initiated.

The energy stored in inductor L1 during the on-time of switch S1 (analogous to interval T1 of FIGS. 2a–2f) charges capacitors C1 and C2 of FIG. 4 with a current of sinusoidal shape (similar to current IL1 of FIG. 2b), which flows also through secondary rectifier D1 of FIG. 1.

When switch S1 becomes non-conductive, the internal drain-source capacitance of the transistor that implements switch S1, which acts as capacitor Ctrig of FIG. 1, is connected in parallel to the series connection of capacitors C1 and C2. When the current through diode D1 becomes zero, a high frequency resonance circuit including capacitor Ctrig, and inductors L1 and L2 operate in a resonance manner. This is analogous to interval T3 of FIGS. 2a–2f. A current flowing through diodes D3, D4 and D5 of FIG. 4 keeps transistors Q4 and Q5 off during a half cycle of resonant oscillation. As soon as this current changes polarity, transistors Q4 and Q5 turn on. Consequently transistor Q2 turns off and transistor switch S1 is turned on via transistor Q3. Transistors Q4 and Q5 act as a current sensor. Transistor Q4 is kept on by the current through transistor switch S1.

When the energy in capacitors C1 and C2 has been transferred to inductor L2, the voltage across inductor L2 reaches a magnitude that causes secondary diode D1 to turn on and the current in capacitor C2, for example, ceases. The current through switch S1 and inductor L1 flows through diode D6 instead of through capacitor C2 and turns on transistor Q2. Thus, diode D6 and transistor Q2 form a current sensor for turning transistor switch S1 off. The procedure will repeat itself as described until burst mode controller 402 turns off the supply of oscillator 401.

Figure 5:
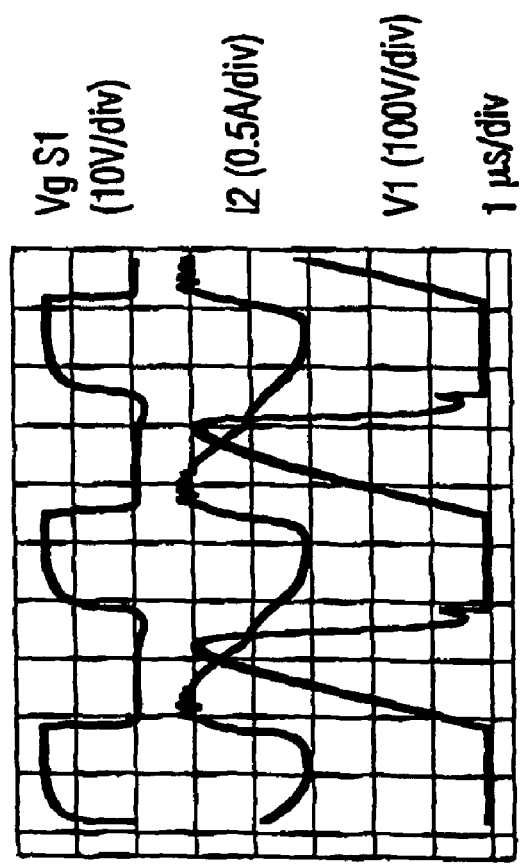
FIGS. 5a, 5b and 5c show waveforms associated with the operation of the power supply shown in FIG. 4 for a first load.
Figure 6:
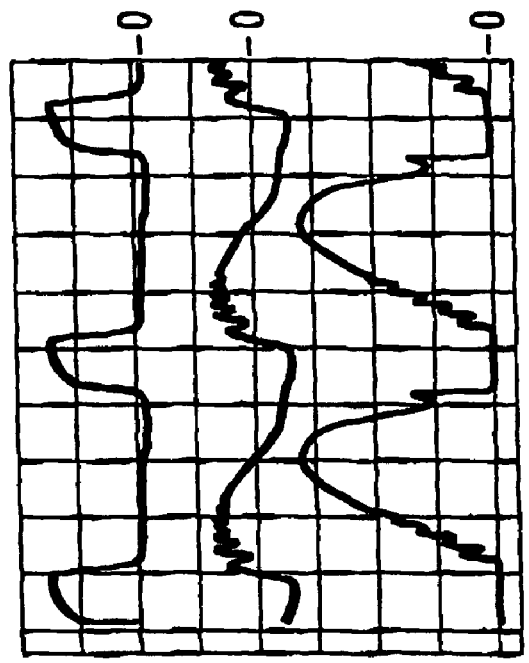
FIGS. 6a, 6b and 6c show waveforms associated with the operation of the power supply shown in FIG. 4 for a load higher than the first load.

FIGS. 5a, 5b and 5c show waveforms associated with the operation of the power supply shown in FIG. 4 for load resistor RL equal to 7.5 Ohm; whereas, FIGS. 6a, 6b and 6c show waveforms associated with the operation of the power supply shown in FIG. 4 for a higher load formed by resistor RL equal to 1 Ohm. Similar symbols and numerals in FIGS. 1, 2a–2f, 3a–3c, 4, 5a–5c and 6a–6c indicate similar functions or items.

If oscillator 401 operates continuously and not in burst mode, and the load, not shown, increases still further as a result of a fault condition, output voltage Vout will drop. As a result, interval T1 of FIGS. 2a–2f increases, the oscillator 401 frequency decreases and the level of voltage V1 of FIG. 6c will be lower than before at the beginning of interval T3 of FIGS. 2a–2f. In this way the amount of transferred energy, advantageously, decreases significantly. This tendency remains until the short-circuit condition is reached. Thus the circuit protects itself against overload.

Figure 8:
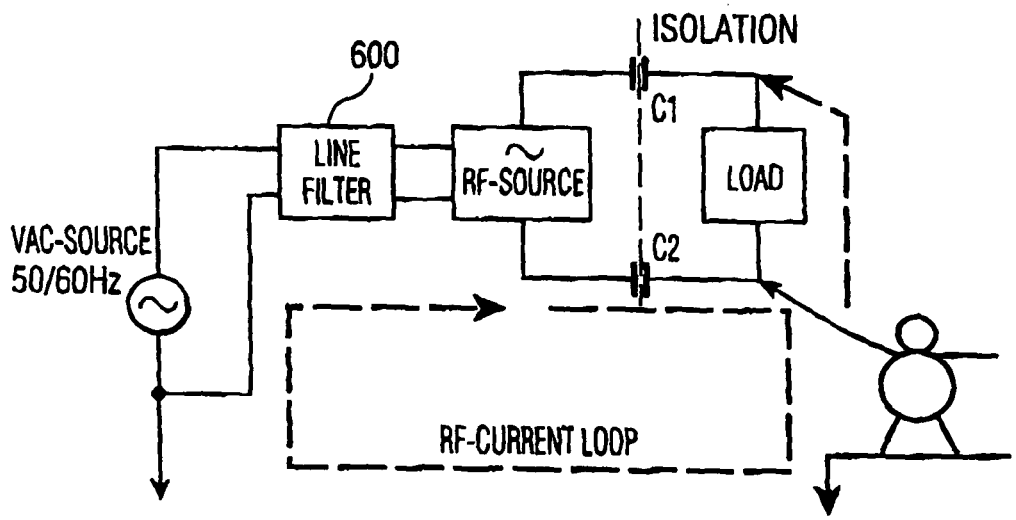
FIG. 8 illustrates schematically a manner by which an immunity against radio frequency interference (RFI) is obtained with the power supply of FIG. 4.

Power supply 400 of FIG. 4 also guarantees a soft start-up. Interval T1 of FIGS. 2a–2f decreases gradually and likewise the frequency and the transferred energy increase until the required level of output voltage Vout is reached. As shown in FIGS. 4 and 8, a line filter 600 is provided for RFI suppression and safety. The filter inductor 601 of FIG. 4 establishes a high symmetrical attenuation at the operating frequency of oscillator 401. An inductor of 20 mH fulfils the required attenuation up to 50 W. During experiments, a considerable temperature increase of the capacitors C1 and C2 was observed. The selection of the proper type and construction of these capacitors is important. If capacitors C1 and C2 are selected with a negative temperature coefficient, some inherent safety is provided, because the amount of transferred power and the temperature decrease with the capacitor value.

The invention claimed is:

1. A power supply, comprising:
   a supply inductor coupled to a first capacitor to form a first resonant circuit for generating a resonant waveform in a resonant operation, during a first portion of an operation cycle of said power supply;
   a charge storage element for developing an output voltage to energize a load;
   a rectifier coupled to said charge storage element and to said first resonant circuit and responsive to said resonant waveform for producing a first change of state in said rectifier, in accordance with said resonant waveform, at an end time of said operation cycle first portion, that causes said output voltage to be coupled back to said first resonant circuit and to interrupt said resonant operation;
   a first sensor for sensing when said first change of state in said rectifier occurs;
   a source of a supply current coupled to said rectifier and rectified in said rectifier to produce a rectified current that is coupled to said charge storage element to replenish a charge therein, during a second portion of said operation cycle; and
   a switching transistor responsive to an output signal of said first sensor for coupling said supply current to said rectifier, after said first change of state in said rectifier occurs, and for decoupling said supply current from said rectifier, prior to an occurrence of said first change of state in said rectifier.

2. The power supply according to claim 1, wherein said charge storage element comprises a filter capacitor for said output voltage.

3. The power supply according to claim 1, wherein said rectifier comprises a two-terminal semiconductor.

4. The power supply according to claim 1, wherein said first capacitor capacitively couples said supply current to said rectifier, and wherein said rectifier couples said output voltage back to said first capacitor to cease a current flow in said first capacitor, when said first change of state in said rectifier occurs.

5. The power supply according to claim 4, wherein said first sensor senses when said current flow ceases in said first capacitor.

6. The power supply according to claim 1, wherein said first capacitor capacitively couples said supply current to said rectifier, during said second portion of said operation cycle.

7. The power supply according to claim 1, further comprising a second inductor coupled to said switching transistor and to a source of an input supply voltage for storing a current in said second inductor, during said operation cycle first portion, wherein said switching transistor enables said second inductor current to be coupled to said rectifier, during said operation cycle second portion and disables said inductor current from being coupled to said rectifier, during said operation cycle first portion.

8. The power supply according to claim 7, wherein said second inductor current varies, during said operation cycle second portion, and wherein said rectifier is responsive to the variation in said second inductor current for producing, in accordance therewith, a second change of state in said rectifier, at an end time of said operation cycle second portion, that is opposite to said first change of state.

9. The power supply according to claim 8, wherein after said second change of state occurs in said rectifier, a capacitance is coupled to at least one of said first and second inductors to form a second resonant circuit that causes a first voltage developed between a pair of main current conducting terminals of said switching transistor to vary in a resonant manner.

10. The power supply according to claim 9, further comprising a second sensor for sensing when a first portion of a resonant cycle of said first voltage has elapsed, wherein said switching transistor is responsive to an output signal of said second sensor to turn on said transistor when said first voltage developed between said pair of main current conducting terminals of said switching transistor is lower than when the resonant manner variation of said first voltage begins so as to reduce power dissipation during a state change in said transistor.

11. The power supply according to claim 1, further comprising a source of an input supply voltage for generating said supply current and a second capacitor, wherein said second capacitor and said first capacitor are coupled in a current path of said supply current for isolating said load from said source of said input supply voltage, at frequencies lower than a frequency of said operation cycle.

* * * * *